(12) United States Patent
Smith et al.

(10) Patent No.: US 12,517,733 B2
(45) Date of Patent: Jan. 6, 2026

(54) CIRCUITS AND METHODS FOR PICKING MULTIPLE READY INSTRUCTIONS PER CYCLE

(71) Applicant: Arm Limited, Cambridge (GB)

(72) Inventors: Rodney Wayne Smith, Wake Forest, NC (US); Prakash S. Ramrakhyani, Austin, TX (US)

(73) Assignee: Arm Limited, Cambridge (GB)

( * ) Notice: Subject to any disclaimer, the term of this patent is extended or adjusted under 35 U.S.C. 154(b) by 18 days.

(21) Appl. No.: 18/590,782

(22) Filed: Feb. 28, 2024

(65) Prior Publication Data

US 2025/0272102 A1 Aug. 28, 2025

(51) Int. Cl.
*G06F 9/38* (2018.01)
*G06F 9/48* (2006.01)

(52) U.S. Cl.
CPC .......... *G06F 9/3836* (2013.01); *G06F 9/4818* (2013.01)

(58) Field of Classification Search
CPC .............................. G06F 9/3836; G06F 9/4818
See application file for complete search history.

(56) References Cited

U.S. PATENT DOCUMENTS

| | | | |
|---|---|---|---|
| 6,892,294 B1 * | 5/2005 | Naffziger | G06F 9/3854 |
| | | | 712/216 |
| 8,156,287 B2 | 4/2012 | Bose et al. | |
| 10,089,114 B2 * | 10/2018 | Kulkarni | G06F 9/3005 |
| 11,194,574 B2 | 12/2021 | Dooley et al. | |
| 11,263,138 B2 | 3/2022 | Pusdesris et al. | |
| 2004/0098548 A1 | 5/2004 | Hansen | |
| 2007/0074005 A1 * | 3/2007 | Abernathy | G06F 9/3856 |
| | | | 712/214 |
| 2008/0288751 A1 | 11/2008 | Kocev | |
| 2011/0239218 A1 * | 9/2011 | Robinson | G06F 9/3836 |
| | | | 718/102 |
| 2012/0144173 A1 * | 6/2012 | Butler | G06F 9/3838 |
| | | | 712/E9.004 |
| 2013/0042089 A1 * | 2/2013 | Vinh | G06F 9/3836 |
| | | | 712/205 |
| 2014/0129806 A1 * | 5/2014 | Kaplan | G06F 9/3836 |
| | | | 712/E9.016 |
| 2014/0201505 A1 * | 7/2014 | Merten | G06F 9/4843 |
| | | | 712/226 |
| 2017/0024205 A1 * | 1/2017 | Kountanis | G06F 9/3836 |
| 2019/0196839 A1 * | 6/2019 | Oliver | G06F 9/3836 |
| 2019/0332385 A1 * | 10/2019 | Smith | G06F 9/3836 |
| 2020/0097411 A1 | 3/2020 | Pusdesris et al. | |
| 2022/0318051 A1 | 10/2022 | Abernathy et al. | |
| 2023/0049662 A1 | 2/2023 | Do | |
| 2023/0195517 A1 * | 6/2023 | Suggs | G06F 9/3856 |
| | | | 718/106 |
| 2024/0061783 A1 | 2/2024 | Durbhakula | |
| 2025/0004769 A1 | 1/2025 | Nouvel et al. | |
| 2025/0272241 A1 | 8/2025 | Lafford | |

FOREIGN PATENT DOCUMENTS

GB 2594498 B 6/2022

OTHER PUBLICATIONS

Office Action, U.S. Appl. No. 18/590,726, Mailed Nov. 5, 2025, 22 pages.

* cited by examiner

*Primary Examiner* — Farley Abad
(74) *Attorney, Agent, or Firm* — Berkeley Law & Technology Group, LLP

(57) ABSTRACT

The present disclosure relates generally to circuitry and methods for picking instructions ready for execution in out-of-order processing circuitry.

20 Claims, 11 Drawing Sheets

CIRCUITS AND METHODS FOR PICKING MULTIPLE READY INSTRUCTIONS PER CYCLE

BACKGROUND

Field

The present disclosure relates generally to circuitry and methods for picking instructions ready for execution in out-of-order processing circuitry.

Information

Integrated circuit devices, such as processors, for example, may be found in a wide range of electronic device types. Computing devices, for example, may include integrated circuit devices, such as processors, to process signals and/or states representative of diverse content types for a variety of purposes. Signal and/or state processing techniques continue to evolve. For example, some processing devices may include circuitry to implement superscalar out-of-order instruction execution, wherein multiple instructions (e.g., micro-operations or micro-ops) may be picked (e.g., selected) to be executed in a given cycle.

SUMMARY

Embodiments may include an apparatus comprising an issue queue logically partitioned into first and second banks. The apparatus may further comprise first and second picker circuits corresponding respectively to the first and second banks, wherein, for a first cycle, the first picker circuit may determine whether one or more instructions from its corresponding first bank are ready, and the second picker circuit may determine whether one or more instructions from its corresponding second bank are ready. Also, responsive at least in part to a determination that one or more instructions from its corresponding first bank are ready, the first picker circuit may select a first ready instruction from its corresponding first bank. Further, responsive at least in part to a determination that no instructions from its corresponding first bank are ready, the first picker circuit may select the first ready instruction from its non-corresponding second bank. Additionally, responsive at least in part to a determination that one or more instructions from its corresponding second bank are ready, the second picker circuit may select a second ready instruction from its corresponding second bank, and, responsive at least in part to a determination that no instructions from its corresponding second bank are ready, the second picker circuit may select the second ready instruction from its non-corresponding first bank.

Embodiments may also include a method comprising logically partitioning an issue queue into first and second banks, wherein first and second picker circuits correspond respectively to the first and second banks. The method may further comprise determining, for a first cycle by the first picker circuit, whether one or more instructions from its corresponding first bank are ready and may additionally comprise determining, for the first cycle by the second picker circuit, whether one or more instructions from its corresponding second bank are ready. Further, responsive at least in part to a determination by the first picker circuit that one or more instructions from the first bank are ready, the method may include selecting, for the first cycle by the first picker circuit, a first ready instruction from the first bank. Also, responsive at least in part to a determination that no instructions from the first bank are ready, the method may comprise selecting, for the first cycle by the first picker circuit, the first ready instruction from the second bank. Additionally, responsive at least in part to a determination that one or more instructions from the second bank are ready, the method may include selecting, for the first cycle by the second picker circuit, a second ready instruction from the second bank. Further, responsive at least in part to a determination that no instructions from the second bank are ready, the method may comprise selecting, for the first cycle by the second picker circuit, the second ready instruction from the first bank.

Embodiments may further include a non-transitory computer-readable medium that may store computer-readable code for fabrication of an apparatus comprising an issue queue logically partitioned into first and second banks and also comprising first and second picker circuits corresponding respectively to the first and second banks. The apparatus for fabrication may also comprise first and second execution units, wherein the first and second picker circuits respectively correspond to the first and second execution units, wherein, for a first cycle, the first picker circuit is to determine whether one or more instructions from its corresponding first bank are ready and the second picker circuit is to determine whether one or more instructions from its corresponding second bank are ready. Also, responsive at least in part to a determination that one or more instructions from its corresponding first bank are ready, the first picker circuit may select a first ready instruction from its corresponding first bank. Further, responsive at least in part to a determination that no instructions from its corresponding first bank are ready, the first picker circuit may select the first ready instruction from its non-corresponding second bank. Additionally, responsive at least in part to a determination that one or more instructions from its corresponding second bank are ready, the second picker circuit may select a second ready instruction from its corresponding second bank, and, responsive at least in part to a determination that no instructions from its corresponding second bank are ready, the second picker circuit may select the second ready instruction from its non-corresponding first bank.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
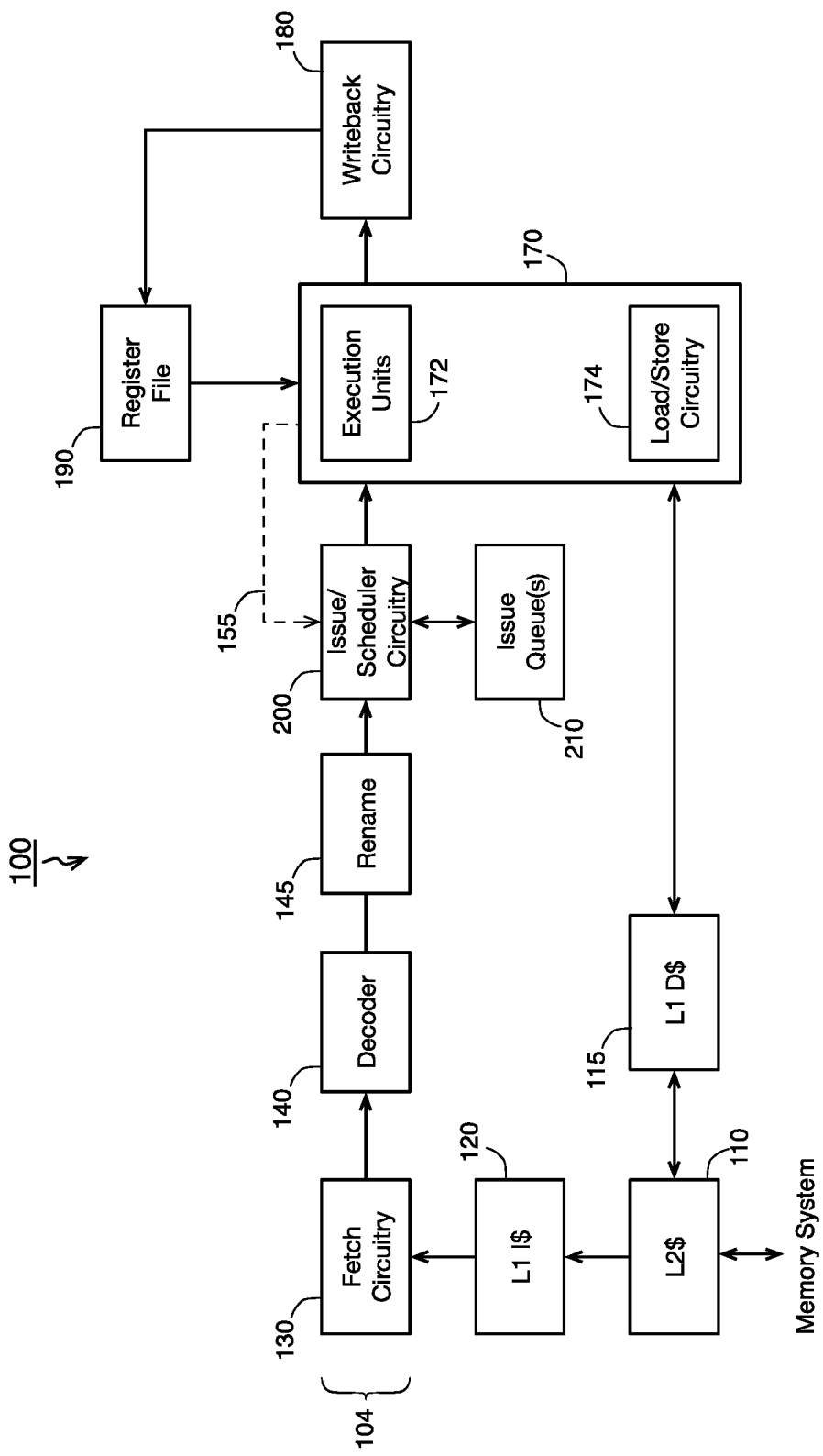
FIG. 1 is a schematic block diagram illustrating example processing circuitry, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. Computing devices, for example, may include integrated circuit devices, such as processors, to process signals and/or states representative of diverse content types for a variety of purposes. Signal and/or state processing techniques continue to evolve. For example, some processing devices may include circuitry to implement superscalar out-of-order instruction execution, wherein multiple instructions (e.g., micro-operations or micro-ops) may be picked (e.g., selected) to be executed in a given execution cycle. In this context, "execution cycle" and/or the like refers to an amount of time for processing circuitry to execute a simple operation, such as an addition micro-operation. As utilized herein, "cycle" and "execution cycle" are synonymous.

In an out-of-order superscalar microprocessor, for example, one or more instructions may be fetched, decoded and dispatched in a given execution cycle. For a given cycle, one or more instructions that may have their operands ready may be selected (e.g., picked) to be executed. In an out-of-order processor, ready instructions may be executed without regard to when the instruction becomes ready in relation to other instructions. Therefore, a younger instruction may be picked for execution ahead of an older instruction if the young instruction's operands become ready prior to the older instruction's operand becoming ready. Additionally, for example, more than one instruction (e.g., micro-operation) may be picked per cycle.

Embodiments described herein may be directed to circuitry and/or algorithm(s) to pick/select multiple instructions/micro-operations from a queue of dispatched instructions to be issued to execution units in manner that may beneficially affect performance characteristics (e.g., instructions-per-cycle (IPC)) of a processing circuit (e.g., central processing unit (CPU), graphics processing unit (CPU), neural processing unit, digital signal processor, etc.).

FIG. 1 is a schematic block diagram illustrating an embodiment of example processing circuitry 100. In implementations, processing circuitry, such as processing circuitry 100, may comprise a processing pipeline, such as processing pipeline 104, that may include a number of pipeline stages. In implementations, processing pipeline 104 may include fetch circuitry, such as fetch circuitry 130, for fetching program instructions from an instruction cache. For example, processing circuitry may include a first level instruction cache (L1I$), such as L1I$ 120, that may provide a more localized cache of instructions to be provided to fetch circuitry 130. Processing pipeline 104 may also include a decoding stage, such as decoder 140, for decoding fetched program instructions to generate decoded instructions, such as micro-operations, to be processed by remaining stages of processing pipeline 104. Processing pipeline 104 may additionally comprise a rename stage 145 to maintain a speculative mapping between a set of architecturally defined registers and a plurality of physical registers in register file 190, for example.

In implementations, processing pipeline 104 may comprise an issue stage, such as issue/scheduler circuitry 200, for checking whether operands required for decoded micro-operations are ready in register file 190 (e.g., operands have been generated via execution of earlier-issued instructions) and/or for issuing instructions for execution once the required operands for a given instruction are ready. One or more issue queues 210 may hold instructions awaiting issuance to an execute stage 170, for example. Execute stage 170 may include one or more execution units 172 for executing data processing operations corresponding to the instructions at least in part by processing operands read from the register file 190 to generate result values. A writeback stage, such as writeback circuitry 180, may also write the result values back to register file 190. In implementations, availability of results for use as source operands may be communicated by execute stage 170 to issue/scheduler circuitry 200, as indicated in FIG. 1 by a schematic data path 155. Implementations discussed herein may include any of a number of techniques, processes, etc. for communicating availability of operands to issue/scheduler circuitry, such as issue/scheduler circuitry 200.

In implementations, executions unit(s) 172 may include any of a number of processing units for executing different classes or categories of micro-operations. For example, execution units 172 may include one or more of an arithmetic/logic unit (ALU) for performing arithmetic or logical operations, a floating-point unit for performing operations on floating-point values, and/or a branch unit for evaluating outcomes of branch operations. In implementations, execution units 172 may comprise multiple types of execution units so that micro-operations of different categories may be executed in parallel and/or may comprise multiple instances of a particular type of execution unit so that multiple micro-operations of a particular type may be executed in parallel.

In implementations, execution stage 170 may comprise a load/store unit, such as load/store circuitry 174, for performing load/store operations to access data in one or more caches, memories, etc. Processing circuitry 100, for example, may include a first level data cache (L1D$), such as L1D$ 115, a second level cache (L2$), such as L2$ 110, and a main system memory (not shown). Also, as mentioned, L1I$ 120 may provide instructions to fetch circuitry 130, for example.

It may be appreciated that processing circuitry 100 is merely an example, and subject matter is not limited in scope in these respects. It may be further appreciated that FIG. 1 is merely a simplified representation of some components of a possible processor pipeline architecture, and processing circuitry 100, for example, may include other elements not illustrated for conciseness.

As mentioned, decoded instructions (e.g., micro-operations) may be provided to issue/scheduler circuitry 200 which may maintain one or more issue queues 210 to hold instructions awaiting issuance to execution stage 170. In implementations, issue/scheduler circuitry 200 may hold instructions in issue queue(s) 210 until the operands required for execution of an instruction are ready. As also mentioned above, embodiments described herein may be directed to circuitry and/or algorithm(s) to pick/select multiple instructions/micro-operations from a queue of dispatched instructions to be issued to execution units in manner that may beneficially affect performance characteristics (e.g., instructions-per-cycle (IPC)) of a processing circuit (e.g., central processing unit (CPU), graphics processing unit (CPU), neural processing unit, digital signal processor, etc.).

As utilized herein, "instruction" and "micro-operation" may be utilized interchangeably. "Dispatched instructions," or "dispatched micro-operations," and/or the like in this context refer to instructions and/or micro-operations that have had register names for their operands translated from architectural register names to physical register names (e.g., registers of register file 190). Dispatched instructions/micro-operations may wait in one of what may be a number of issue queues for operands to become ready so that they can be issued to one of a plurality of execution units that may be tasked with performing the operation and/or computation specified by the instructions.

A given issue queue, such as issue queue(s) 210, may include a set of buffers where instructions may be stored in waiting for their operands to become ready. As mentioned, processing circuitry, such as superscalar out-of-order processors, for example, may include a number of issue queues to allow multiple instructions to be issued in a given cycle. In implementations, issue queues may issue a relatively smaller number of instructions per cycle (e.g., one or two). If at a given time an issue queue has more instructions ready than can be issued in a given cycle, picker circuitry (e.g., see picker circuits 221 and 222 of FIG. 2, discussed below) may determine which of the ready instructions are to be selected/picked for issuance to execution units for the given cycle. "Ready instruction" and/or the like refers to an instruction, awaiting issuance in an issue queue, whose operands required for execution are ready (e.g., operands have been generated via execution of earlier-issued instructions). An instruction may also be deemed "ready" in circumstances in which operands will become available as execution results for a current cycle become available for a next cycle, for example.

Several algorithms have been utilized to select ready instructions held in an issue queue. For example, for circumstances in which an issue queue is limited to issuing one instruction per cycle, the picker circuit/select logic may pick the highest priority ready instruction (e.g., the ready instruction least recently added to the issue queue). In other circumstances, if an issue queue may issue up to two instructions in a given cycle, the picker circuit/select logic (which may include first and second picker circuits to pick respective ready instructions for a given cycle) may select a first instruction of one category and a second instruction of a different category. For example, a first picker circuit may pick a ready ADD instruction and a second picker circuit may pick a ready MUL (multiply) instruction. In this circumstance, each picker circuit may pick instructions of a particular category and would ignore instructions of other categories. That is, a first picker circuit picks only instructions of a first category and a second picker circuit picks only instructions of a second category. Such a separation of picker circuits by category might allow for design of separate pipelines for individual categories of instructions, which might, in some circumstances, achieve a higher clock frequency as compared with a non-partitioned implementation due to the two picker circuits having the ability to operate independent of each other and to pick instructions in parallel. However, because each picker in this scenario can only pick instructions of a particular category, in circumstances in which multiple ADD instructions where ready and no MUL instructions were ready in a given cycle, only a single ADD instruction would be picked and issued for the given cycle, thereby reducing instructions per cycle (IPC).

Another approach may include picking the two oldest ready instructions regardless of category. For example, in a given cycle, if an issue queue has two ADD instructions and a MUL instruction ready, with the two ADD instructions being older (e.g., less recently added to the issue queue) than the MUL instruction, a configuration having picker circuits that can pick either instruction category type may pick both ADD instructions as being the two oldest ready instructions. However, as will be explained, the two picks are not independent of each other. In order to identify the second-oldest ready instruction, the oldest ready instruction must be first identified, marked 'selected/picked' and then the oldest remaining ready instruction can be determined. Using the current approach, due to this dependency, it may not be possible to identify both picks in a single cycle, again reducing IPC, for example.

Yet another approach may be to color instructions (e.g., at dispatch time) using a single bit regardless of instruction class or category and assigning a color to each of the two picker circuits as well. Each picker would then evaluate ready instructions corresponding to only one of the two colors. If, however, in any given cycle all the ready instructions all correspond to only one of the two colors, this current approach would be able to pick only one instruction.

With the example approaches to picking two ready instructions from a single issue queue discussed above, one approach may not be viable to pick two ready instructions in a single cycle because a decision on the second pick was dependent on a decision for the first pick. The other two approaches may result in reduced throughput (e.g., IPC) due to lost opportunity to pick two ready instructions in some circumstances when more than two instructions are ready. To address these shortcomings, example embodiments may be directed to an approach that may be viable for picking two ready instructions in a single cycle and that may improve (e.g., maximize) throughput (e.g., IPC). In implementations, this may be accomplished by allowing for first and second picker circuits to operate independent of each other, as discussed more fully below. As also discussed more fully below, embodiments may include logically partitioning an issue queue into first and second banks corresponding to first and second picker circuits, for example. Although examples discussed herein may describe a single issue queue, it may be appreciated that processing circuitry, such as processing circuitry 100, may include multiple issue queues, and that subject matter is not limited in scope in these respects.

Figure 2:
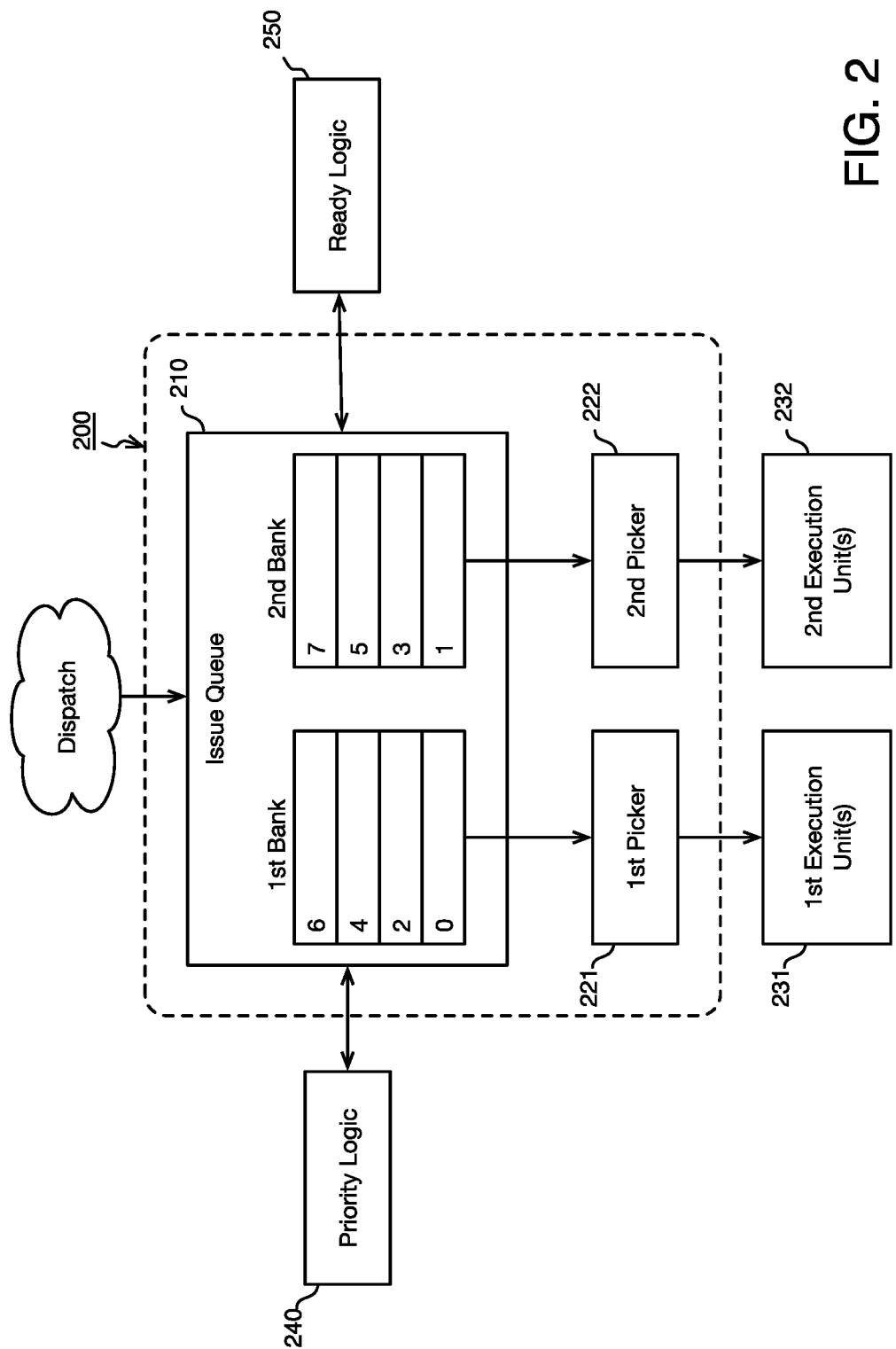
FIG. 2 is a schematic block diagram illustrating example issue/scheduler circuitry, in accordance with an embodiment.

FIG. 2 is a schematic block diagram illustrating example issue/scheduler circuitry 200. As depicted in FIG. 2, dispatched instructions may be stored in issue queue 210 to await issuance to an execution unit. As mentioned above, dispatched instructions comprise instructions that have had register names for their operands translated from architectural register names to physical register names, for example. Issue/scheduler circuitry 200 may also include first picker circuit 221 and second picker circuit 222. In implementations, first picker circuit 221 may correspond to first execution unit(s) 231 and second picker circuit 222 may correspond to second execution unit(s) 232. Further, in implementations, first picker circuit 221 may pick ready instructions to issue to first execution unit(s) 231 while second picker circuit 222 may pick ready instructions to issue to second execution unit(s) 232. Also, for example, execution units 172 depicted in FIG. 1 may include first execution unit 231 and second execution unit 232 in implementations.

In implementations, issue queue 210 may be partitioned (e.g., logically) into first and second banks. Various implementations of issue queues, such as issue queue 210, may include any of a wide range of numbers of entries. First and second banks of issue queue 210 are depicted as including four entries each. However, the depiction of a relatively few numbers of entries is for purposes of ease of explanation and clarity, and implementations may include larger numbers of entries, for example. Further, although first and second banks are described, subject matter is not limited to two banks. Also, in implementations, each of the two banks of issue queue 210 may correspond to a particular picker circuit. As explained more fully below, although each of the two banks may correspond to a particular picker circuit, the picker circuits may evaluate entries in either bank of issue queue 210. As also explained more fully below, each picker circuit may operate independent of the other picker circuit, in implementations.

Additionally, priority logic 240 may evaluate entries of issue queue 210 to determine one or more priority parameters. In implementations, priority logic 240 may evaluate entries of issue queue 210 on a per-cycle basis. Further, priority logic 240 may determine highest priority ready instructions and/or a lowest priority ready instructions for the first and second banks of issue queue 210, for example. In implementations, a highest priority ready instruction may comprise an instruction least-recently added to issue queue 210 and/or a lowest priority ready instruction may comprise an instruction most-recently added to issue queue 210, for example. Although examples described herein may base priority on when instructions are added to issue queue 210, other implementations may base priority on other instruction characteristics and/or circumstances. Further, priority logic 240 may be implemented in any of a wide range of circuits, algorithms, etc., and subject matter is not limited in scope in this respect.

Also, in implementations, ready logic circuit 250 may evaluate, track, and/or report readiness for entries of issue queue 210. As mentioned, an instruction is "ready" when operands involved in executing the instruction are present in specified registers (e.g., in register file 190), having been generated via execution of earlier-issued instructions, for example. An instruction may also be deemed "ready" for a next cycle in circumstances in which operands will become available as execution results for a current cycle become available. That is, a picker circuit may select, for a next cycle, an instruction whose operands may not be currently stored in a specified register but whose operands will be available in the specified register(s) in time to execute the particular instruction in the next cycle. In implementations, picker circuits rely on indications of readiness to understand which instructions are eligible to be picked. In implementations, individual entries of an issue queue may include fields specifying a particular instruction (e.g., micro-operation) and its operands, an index value, a priority parameter, and a field indicating readiness, for example.

Figure 3:
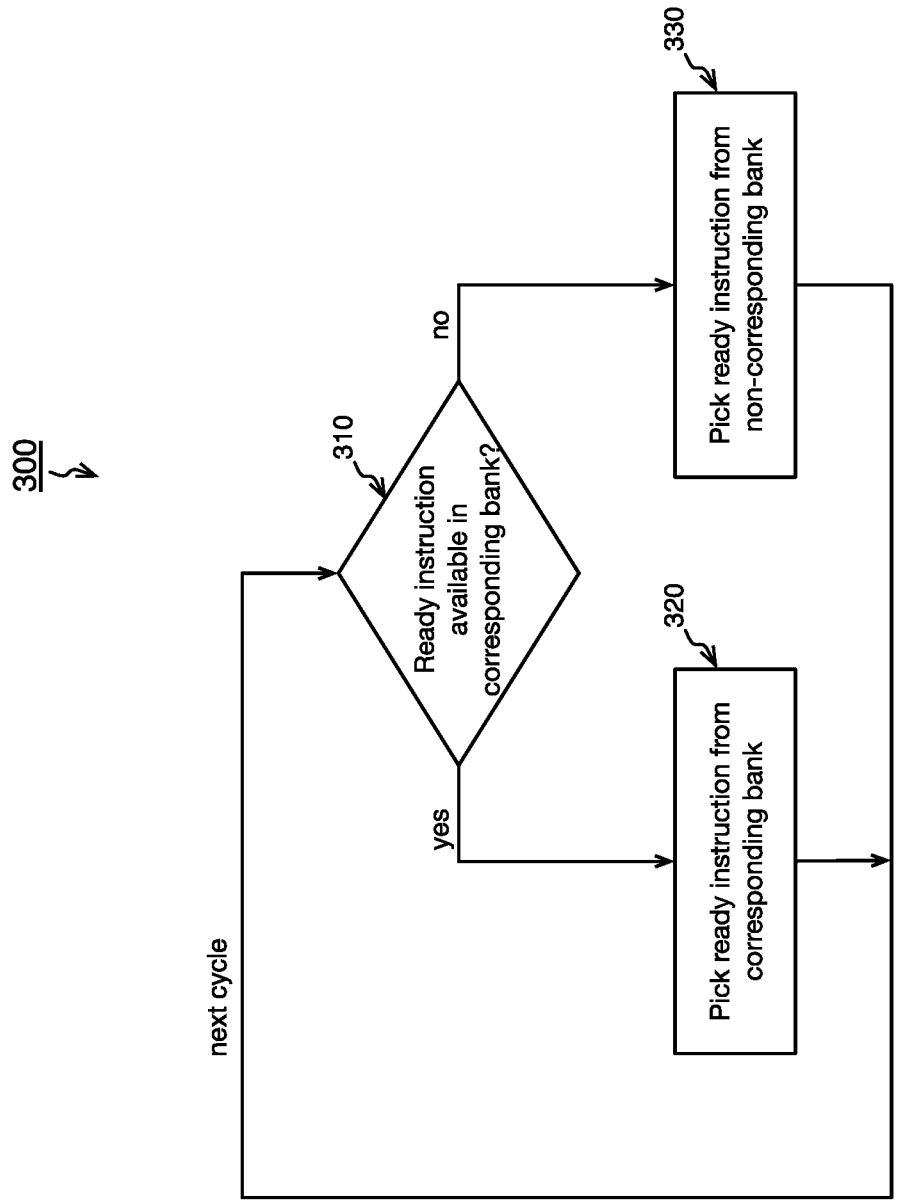
FIG. 3 flow diagram depicting an example algorithm for picking instructions from a partitioned issue queue, in accordance with an embodiment.

FIG. 3 flow diagram depicting an example algorithm 300 for picking instructions from a partitioned issue queue, such as issue queue 210. In implementations, example algorithm 300 may be performed in connection with the example implementation depicted in FIG. 2. For example, algorithm 300 may be performed by each of first picker circuit 221 and second picker circuit 222 in a parallel fashion. Also, in implementations, algorithm 300 may be performed by first picker circuit 221 and second picker circuit 222, for example, on a per-cycle basis.

As depicted at block 310, a determination may be made as to whether a ready instruction is available in a corresponding bank of issue queue 210. For example, as mentioned, the first bank of issue queue 210 may correspond to first picker circuit 221 and the second bank of issue queue 210 may correspond to second picker circuit 222. Therefore, as indicated at block 310, first picker circuit 221 may determine whether a ready instruction is available in the first bank of issue queue 210, and second picker circuit 222 may determine whether a ready instruction is available in the second bank of issue queue 210. Each picker circuit may make this determination independent of the other picker circuit, for example.

In implementations, responsive at least in part to a determination that a ready instruction (e.g., one or more ready instructions) is available in the corresponding bank of issue queue 210, a picker circuit may pick a ready instruction from the corresponding bank as indicated at block 320. For example, responsive at least in part to a determination that one or more ready instructions are available in the first bank of issue queue 210, first picker circuit 221 may pick one of the one or more ready instructions from the first bank. Further, the picked ready instruction may be issued to corresponding execution unit(s) 231. Additionally, for example, responsive at least in part to a determination that one or more ready instructions are available in the second bank of issue queue 210, second picker circuit 221 may pick one of the one or more ready instructions from the second bank, and the picked ready instruction may be issued to corresponding execution unit(s) 231.

Additionally, as indicated at block 330, responsive at least in part to a determination that a ready instruction (e.g., one or more ready instructions) is not available in the corresponding bank of issue queue 210, a picker circuit may pick a ready instruction from a non-corresponding bank of issue queue 210. For example, responsive at least in part to a determination that one or more ready instructions are not available in the first bank of issue queue 210, first picker circuit 221 may pick a ready instruction from the second bank. Also, responsive at least in part to a determination that one or more ready instructions are not available in the second bank of issue queue 210, second picker circuit 222 may pick a ready instruction from the first bank. As mentioned, each of the picker circuits may perform these operations independent of the other picker circuit. In this manner, even in circumstances wherein two or more ready instructions all belong to a particular bank of issue queue 210, two picks may be achieved.

It may be noted that a characteristic of example embodiments discussed herein is that picker circuits may not be limited to evaluating and/or picking entries within their corresponding bank of the issue queue. It may also be noted that another characteristic of example embodiments discussed herein is that individual picker circuits may make these evaluations and/or selections independent of evaluations and/or selections made by the other picker circuit, for example.

As discussed more fully below, picker circuits may select ready instructions from their corresponding banks of issue queue 210 and/or may select ready instructions from their non-corresponding bank based at least in part the relative priority of entries of the first and second banks of issue queue 210, for example.

Figure 4:
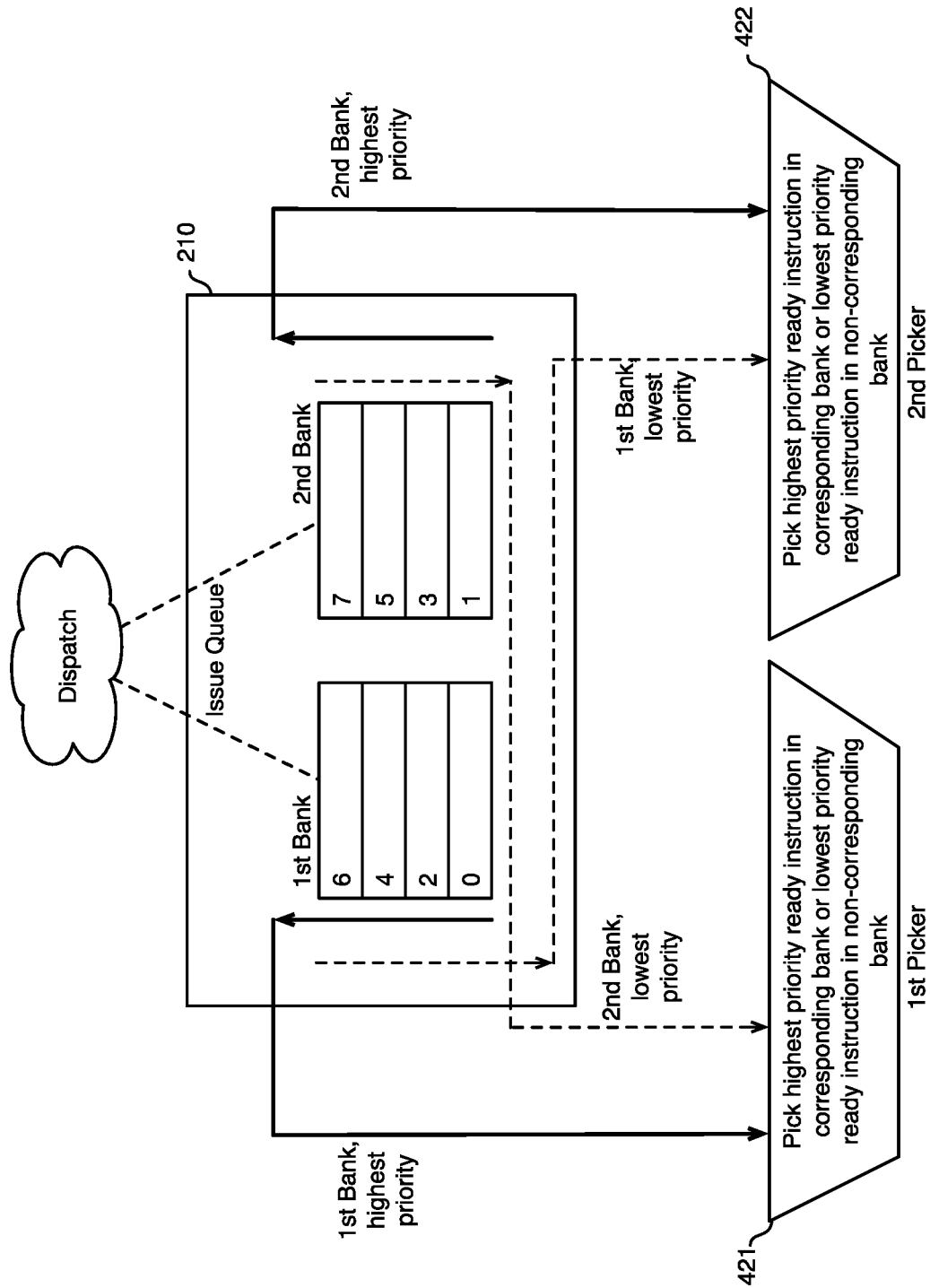
FIG. 4 is an illustration depicting example techniques for picking instructions from a partitioned issue queue based at least in part on instruction priority status, in accordance with an embodiment.

FIG. 4 is an illustration depicting example techniques for picking instructions from a partitioned issue queue based at least in part on instruction priority status, for example. FIG. 4 again depicts issue queue 210 partitioned into first and second banks, wherein individual banks include multiple entries to store multiple instructions awaiting issuance to an execution unit. As discussed above, first bank of issue queue 210 may correspond to a first picker circuit, such as first picker circuit 221, and second bank of issue queue 210 may correspond to a second picker circuit, such as first picker circuit 222.

As indicated at block 421, first picker circuit 221 may pick the highest priority ready instruction in the corresponding first bank of issue queue 210 or, in circumstances wherein no ready instructions are available in the corresponding bank, may pick a lowest priority instruction from the non-corresponding second bank of issue queue 210, in implementations. Further, as indicated at block 421, second picker circuit 222 may pick the highest priority ready instruction in the corresponding second bank of issue queue 210 or, in circumstances wherein no ready instructions are available in the corresponding bank, may pick a lowest priority instruction from the non-corresponding first bank of issue queue 210, for example.

In implementations, priority for the various entries of the first and second banks of issue queue 210 may be determined based on when an instruction is dispatched to the issue queue. For example, entries less recently added to issue queue 210 may be assigned a higher priority than more recently added entries. Also, as mentioned, priority logic, such as priority logic 240, may evaluate entries of issue queue 210 to determine priority parameters on a per-cycle basis. In implementations, highest and/or lowest priority entries may be determined for each bank of issue queue 210 on a per-cycle basis. Also, in implementations, priority may be evaluated across both banks of issue queue 210 to determine an overall highest priority entry, for example.

Therefore, on a per-cycle basis, first picker circuit 221 may pick a least-recently added ready instruction in the corresponding first bank of issue queue 210 or, in circumstances wherein no ready instructions are available in the corresponding bank, may pick a most-recently added instruction from the non-corresponding second bank of issue queue 210, in implementations. Further, as indicated at block 421, second picker circuit 222 may pick a least-recently added ready instruction in the corresponding second bank of issue queue 210 or, in circumstances wherein no ready instructions are available in the corresponding bank, may pick a most-recently added instruction from the non-corresponding first bank of issue queue 210. Thus, for example, even in circumstances wherein two or more ready instructions all belong to a particular bank of issue queue 210, two picks may be achieved for a given cycle.

Figure 5:
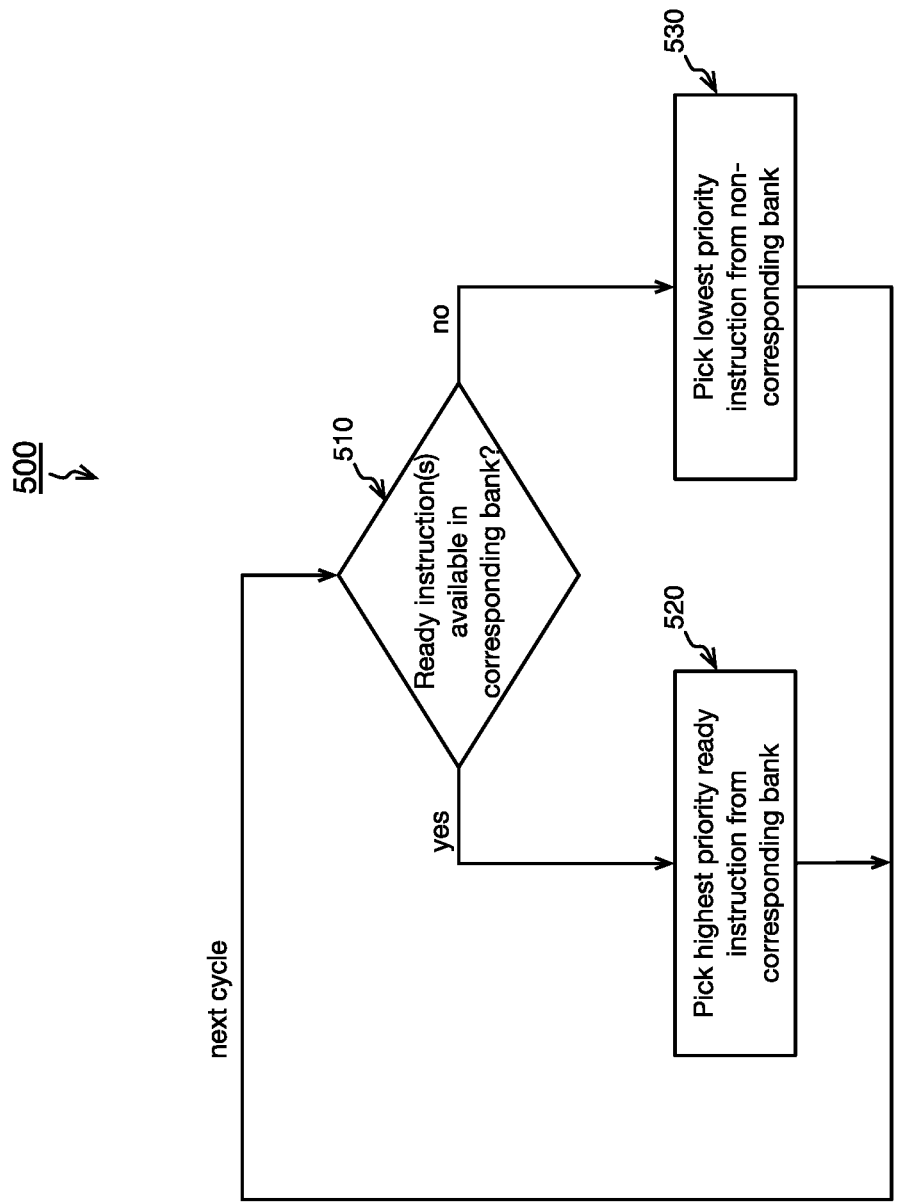
FIG. 5 is a flow diagram depicting an example algorithm for picking instructions from a partitioned issue queue based at least in part on instruction priority status, in accordance with an embodiment.

FIG. 5 is a flow diagram depicting an example algorithm 500 for picking instructions from a partitioned issue queue based at least in part on instruction priority status, in implementations. It may be noted that example algorithm 500 restates at least some of the operations discussed above in connection with FIG. 4. In implementations, example algorithm 500 may be performed in connection with the example implementation depicted in FIG. 2. For example, algorithm 500 may be performed by each of first picker circuit 221 and second picker circuit 222 in a parallel fashion. Also, in implementations, algorithm 500 may be performed by first picker circuit 221 and second picker circuit 222, for example, on a per-cycle basis.

As depicted at block 510, a determination may be made as to whether a ready instruction is available in a corresponding bank of issue queue 210. For example, as mentioned, the first bank of issue queue 210 may correspond to first picker circuit 221 and the second bank of issue queue 210 may correspond to second picker circuit 222. Therefore, as indicated at block 510, first picker circuit 221 may determine whether a ready instruction is available in the first bank of issue queue 210, and second picker circuit 222 may determine whether a ready instruction is available in the second bank of issue queue 210. Each picker circuit may make this determination independent of the other picker circuit, for example.

Responsive at least in part to a determination that a ready instruction (e.g., one or more ready instructions) is available in the corresponding bank of issue queue 210, a picker circuit may pick a highest priority ready instruction (e.g., least-recently added ready instruction) from the corresponding bank as indicated at block 520. For example, responsive at least in part to a determination that one or more ready instructions are available in the first bank of issue queue 210, first picker circuit 221 may pick a highest priority (e.g., least-recently added ready instruction) ready instruction from the first bank. Additionally, for example, responsive at least in part to a determination that one or more ready instructions are available in the second bank of issue queue 210, second picker circuit 221 may pick a highest priority ready instruction (e.g., least-recently added ready instruction) from the second bank.

Additionally, as indicated at block 530, responsive at least in part to a determination that a ready instruction (e.g., one or more ready instructions) is not available in the corresponding bank of issue queue 210, a picker circuit may pick a lowest priority ready instruction (e.g., most-recently added ready instruction) from a non-corresponding bank of issue queue 210. For example, responsive at least in part to a determination that one or more ready instructions are not available in the first bank of issue queue 210, first picker circuit 221 may pick a lowest priority ready instruction (e.g., most-recently added ready instruction) from the second bank. Also, responsive at least in part to a determination that one or more ready instructions are not available in the second bank of issue queue 210, second picker circuit 222 may pick a lowest priority ready instruction (e.g., most-recently added ready instruction) from the first bank. As mentioned, each of the picker circuits may perform these operations independent of the other picker circuit.

It may gain be noted that a characteristic of example embodiments discussed herein is that picker circuits may not be limited to evaluating and/or picking entries within their corresponding bank of the issue queue. It may be further noted that another characteristic of example embodiments discussed herein is that individual picker circuits may make these evaluations and/or selections independent of evaluations and/or selections made by the other picker circuit, for example.

Figure 6:
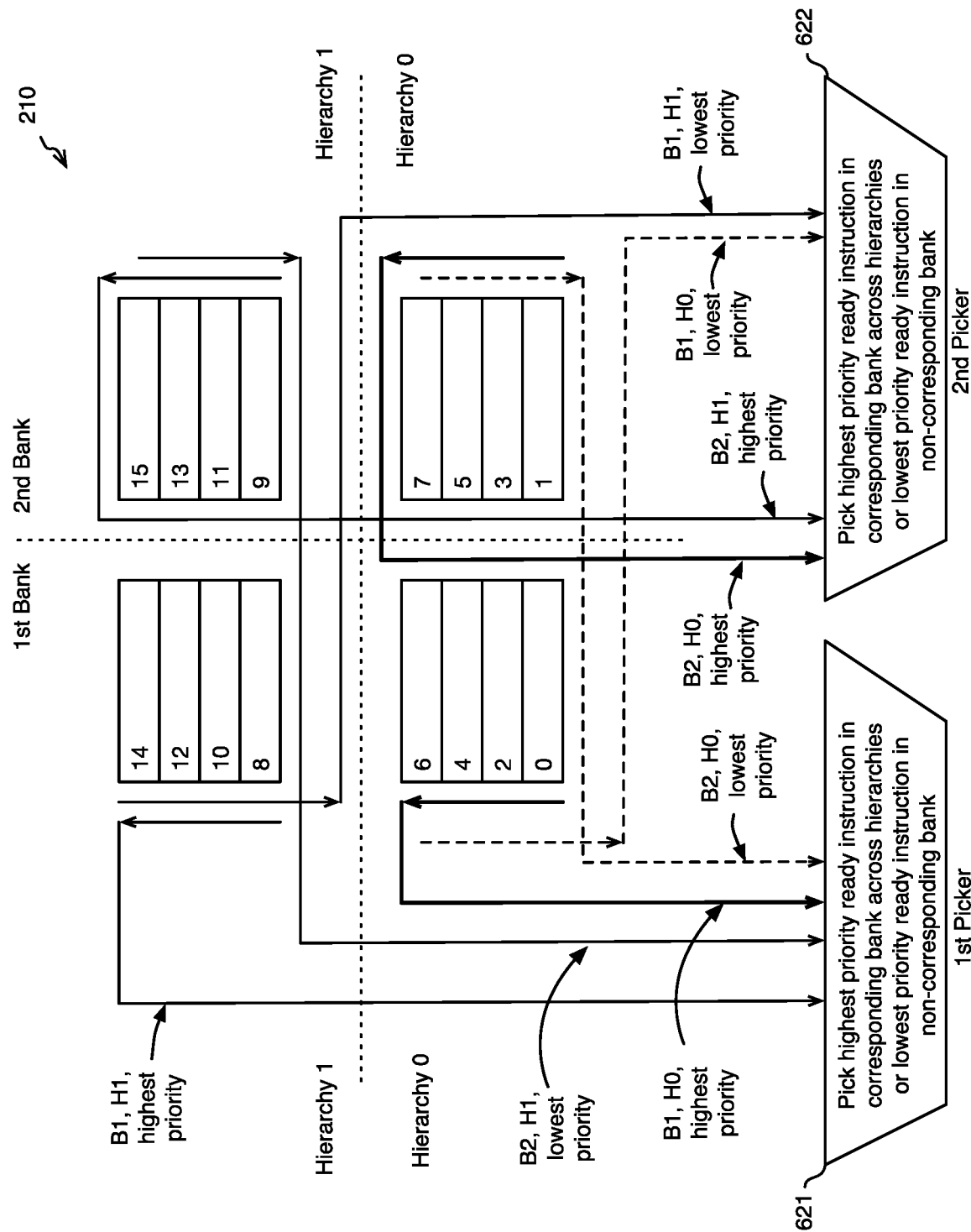
FIG. 6 is an illustration depicting example techniques for picking instructions from a partitioned, hierarchical issue queue based at least in part on instruction priority status, in accordance with an embodiment.

FIG. 6 is an illustration depicting example techniques for picking instructions from a partitioned, hierarchical issue queue based at least in part on instruction priority status. FIG. 6 depicts issue queue 210 partitioned into first and second banks and also partitioned into hierarchical zones. Although two banks and two zones are depicted and discussed, subject matter is not limited in scope in these respects. For example, implementations may not be limited to two banks and/or may not be limited to two zones.

As indicated at block 621, first picker circuit 221 may pick a highest priority ready instruction in its corresponding first bank across the hierarchies (e.g., hierarchical zone 0 and hierarchical zone 1) or may pick a lowest priority ready instruction from its non-corresponding second bank across the hierarchies. For example, first picker circuit 221 may select a highest priority entry from first bank, hierarchical zone 0. If no ready instruction is available in the first bank, hierarchical zone 0, first picker circuit 221 may select a highest priority entry from first bank, hierarchical zone 1. Further, if no ready instruction is available in the first bank, hierarchical zone 1, first picker circuit 221 may select a lowest priority entry from the second bank, hierarchical zone 1. Additionally, if no ready instruction is available to first picker circuit 221 from the second bank, hierarchical zone 1, first picker circuit 221 may select a lowest priority entry from the second bank, hierarchical zone 0.

As indicated at block 622, second picker circuit 222 may pick a highest priority ready instruction in its corresponding second bank across the hierarchies (e.g., hierarchical zone 0 and hierarchical zone 1) or may pick a lowest priority ready instruction from its non-corresponding first bank across the hierarchies. For example, second picker circuit 222 may select a highest priority entry from the second bank, hierarchical zone 0. If no ready instruction is available in the second bank, hierarchical zone 0, second picker circuit 222 may select a highest priority entry from second bank, hierarchical zone 1. If no ready instruction is available in the second bank, hierarchical zone 1, second picker circuit 222 may select a lowest priority entry from the first bank, hierarchical zone 1. Additionally, if no ready instruction is available to second picker circuit 222 from the first bank, hierarchical zone 1, second picker circuit 222 may select a lowest priority entry from the first bank, hierarchical zone 0. Again, this example approach may be expanded to include more than two banks and/or more than two hierarchical zones, in implementation.

Figure 7:
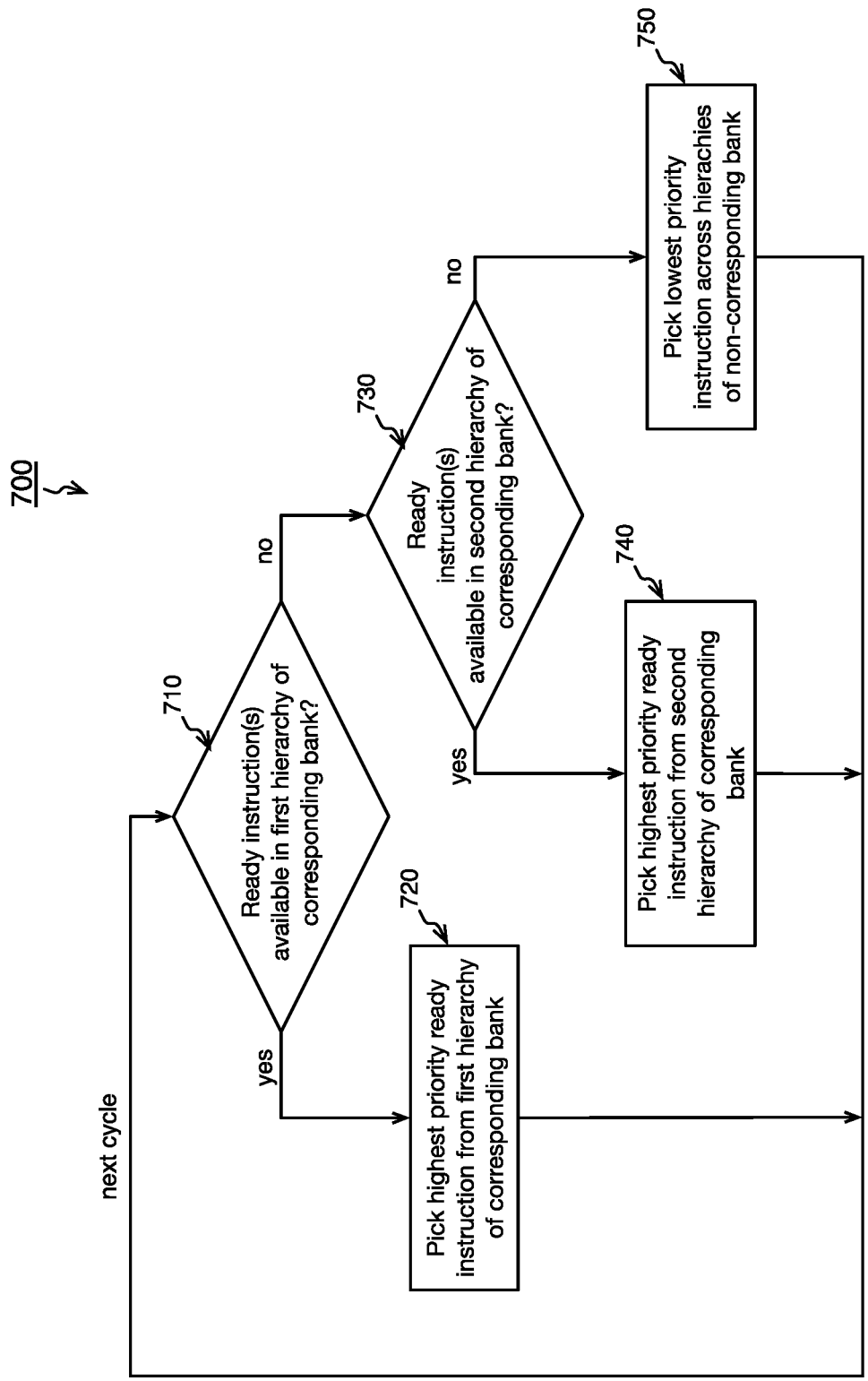
FIG. 7 is a flow diagram depicting an example algorithm for picking instructions from a partitioned, hierarchical issue queue based at least in part on instruction priority status, in accordance with an embodiment.

FIG. 7 is a flow diagram depicting an example algorithm 700 for picking instructions from a partitioned, hierarchical issue queue, such as issue queue 210, based at least in part on instruction priority status. It may be noted that example algorithm 700 restates at least some of the operations discussed above in connection with FIG. 6. In implementations, example algorithm 700 may be performed by each of first picker circuit 221 and second picker circuit 222 in a parallel fashion. Also, in implementations, algorithm 700 may be performed by first picker circuit 221 and second picker circuit 222, for example, on a per-cycle basis.

As indicated at block 710, a determination may be made as to whether a ready instruction is available in a first hierarchical zone of a corresponding bank of issue queue 210. For example, first picker circuit 221 may determine whether a ready instruction is available in the first bank, hierarchical zone 0 of issue queue 210, and second picker circuit 222 may determine whether a ready instruction is available in the second bank, hierarchical zone 0 of issue queue 210.

Responsive at least in part to a determination that a ready instruction (e.g., one or more ready instructions) is available in the first hierarchical zone (e.g., zone 0) of corresponding bank of issue queue 210, a picker circuit may pick a highest priority ready instruction (e.g., least-recently added ready instruction) from the first hierarchical zone of the corresponding bank as indicated at block 720. For example, responsive at least in part to a determination that one or more ready instructions are available in first bank, hierarchical zone 0 of issue queue 210, first picker circuit 221 may pick a highest priority (e.g., least-recently added ready instruction) ready instruction from the first bank, hierarchical zone 0. Additionally, for example, responsive at least in part to a determination that one or more ready instructions are available in the second bank, hierarchical zone 0 of issue queue 210, second picker circuit 221 may pick a highest priority ready instruction (e.g., least-recently added ready instruction) from the second bank, hierarchical zone 0.

In circumstances in which no ready instruction is available in the first hierarchical zone of a corresponding bank, a determination may be made as to whether a ready instruction is available in a second hierarchical zone of a corresponding bank of issue queue 210. For example, first picker circuit 221 may determine whether a ready instruction is available in the first bank, hierarchical zone 1 of issue queue 210, and second picker circuit 222 may determine whether a ready instruction is available in the second bank, hierarchical zone 1 of issue queue 210.

Responsive at least in part to a determination that a ready instruction (e.g., one or more ready instructions) is available in the second hierarchical zone (e.g., zone 1) of corresponding bank of issue queue 210, a picker circuit may pick a highest priority ready instruction (e.g., least-recently added ready instruction) from the second hierarchical zone of the corresponding bank as indicated at block 740. For example, responsive at least in part to a determination that one or more ready instructions are available in first bank, hierarchical zone 1 of issue queue 210, first picker circuit 221 may pick a highest priority (e.g., least-recently added ready instruction) ready instruction from the first bank, hierarchical zone 1. Additionally, for example, responsive at least in part to a determination that one or more ready instructions are available in the second bank, hierarchical zone 1 of issue queue 210, second picker circuit 221 may pick a highest priority ready instruction (e.g., least-recently added ready instruction) from the second bank, hierarchical zone 1.

Additionally, for example, responsive at least in part to a determination that no ready instructions are available in the second hierarchical zone (e.g., zone 1) of corresponding bank of issue queue 210, a picker circuit may pick a lowest priority ready instruction (e.g., least-recently added ready instruction) from across the hierarchies of the non-corresponding bank as indicated at block 750. For example, first picker circuit 221 may, in this circumstance, look to select a lowest priority ready instruction from hierarchical zone 0 of the second bank of issue queue 210 and if no such ready instruction is available may select a lowest priority ready instruction from hierarchical zone 1 of the second bank of issue queue 210. Also, for example, second picker circuit 222 may, in this circumstance, look to select a lowest priority ready instruction from hierarchical zone 0 of the first bank of issue queue 210 and if no such ready instruction is available may select a lowest priority ready instruction from hierarchical zone 1 of the first bank of issue queue 210.

Figure 8:
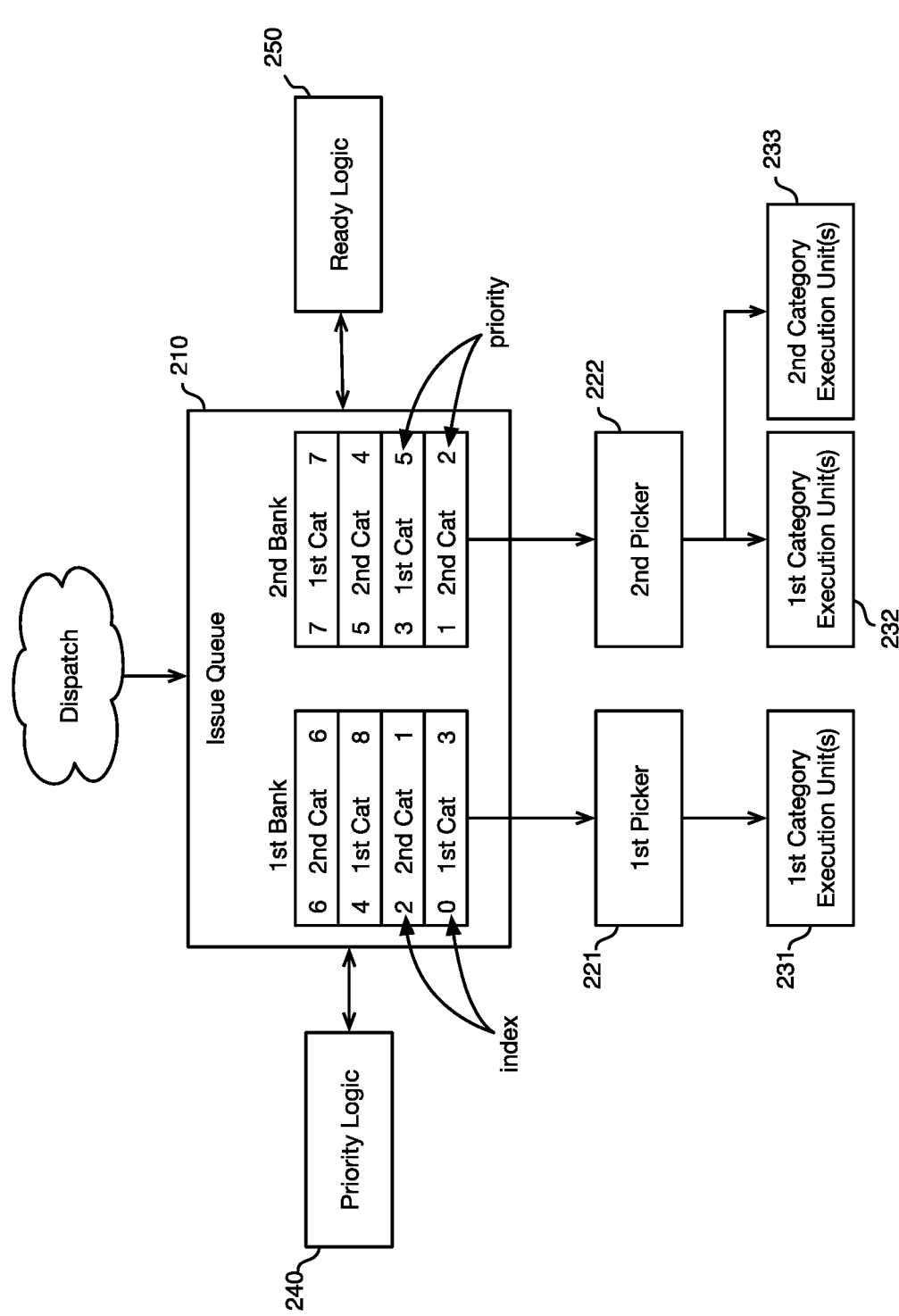
FIG. 8 is a schematic block diagram illustrating example issue/scheduler circuitry and multiple categories of execution units, in accordance with an embodiment.

FIG. 8 is a schematic block diagram illustrating example issue/scheduler circuitry, including issue queue 210, and multiple categories of execution units. In some implementations, instructions may be categorized, such as in accordance with a particular type of execution unit (or cluster of execution units) to be utilized to execute a particular instruction. For example, ADD instructions may be executed on a first category of execution unit types and MUL instructions may be executed on a second category of execution unit types. In implementations, a picker circuit may correspond to one or more particular categories of execution units. For example, as depicted in FIG. 8, first picker circuit 221 may correspond to execution unit(s) 231 that may execute a first category of instructions (e.g., ADD instructions). Also, for example, second picker circuit 222 may correspond to execution unit(s) 232 that may also execute a first category of instructions (e.g., ADD instructions) and may also correspond to execution unit(s) 233 that may execute a second category of instructions (e.g., MUL instructions). Thus, for this present example, ADD instructions of issue queue 210 may be selected by either/or both of the first and second picker circuits, and MUL instructions of issue queue 210 may be selected by only the second picker circuit.

As mentioned, execution unit(s), such as execution units 231, 232, and/or 233, may comprise one or more execution circuits. In some implementations, one or more execution units may comprise multiple execution circuits arranged in a cluster. For example, execution unit 233 may comprise a cluster of execution circuits that may be utilized to execute a second category of instructions.

An example algorithm for selecting ready instructions from a partitioned issue, such as issue queue 210, in circumstances wherein a particular category of instruction may only be picked by a particular picker circuit is provided below in connection with FIG. 9. As described more fully below, in implementations such as that depicted in FIG. 8, when a highest priority ready instruction across both banks of issue queue 210, for example, is of a category of instruction that can only be picked by a particular picker circuit, the particular picker circuit may select that highest priority ready instruction without regard for which bank in which the instruction resides.

Figure 9:
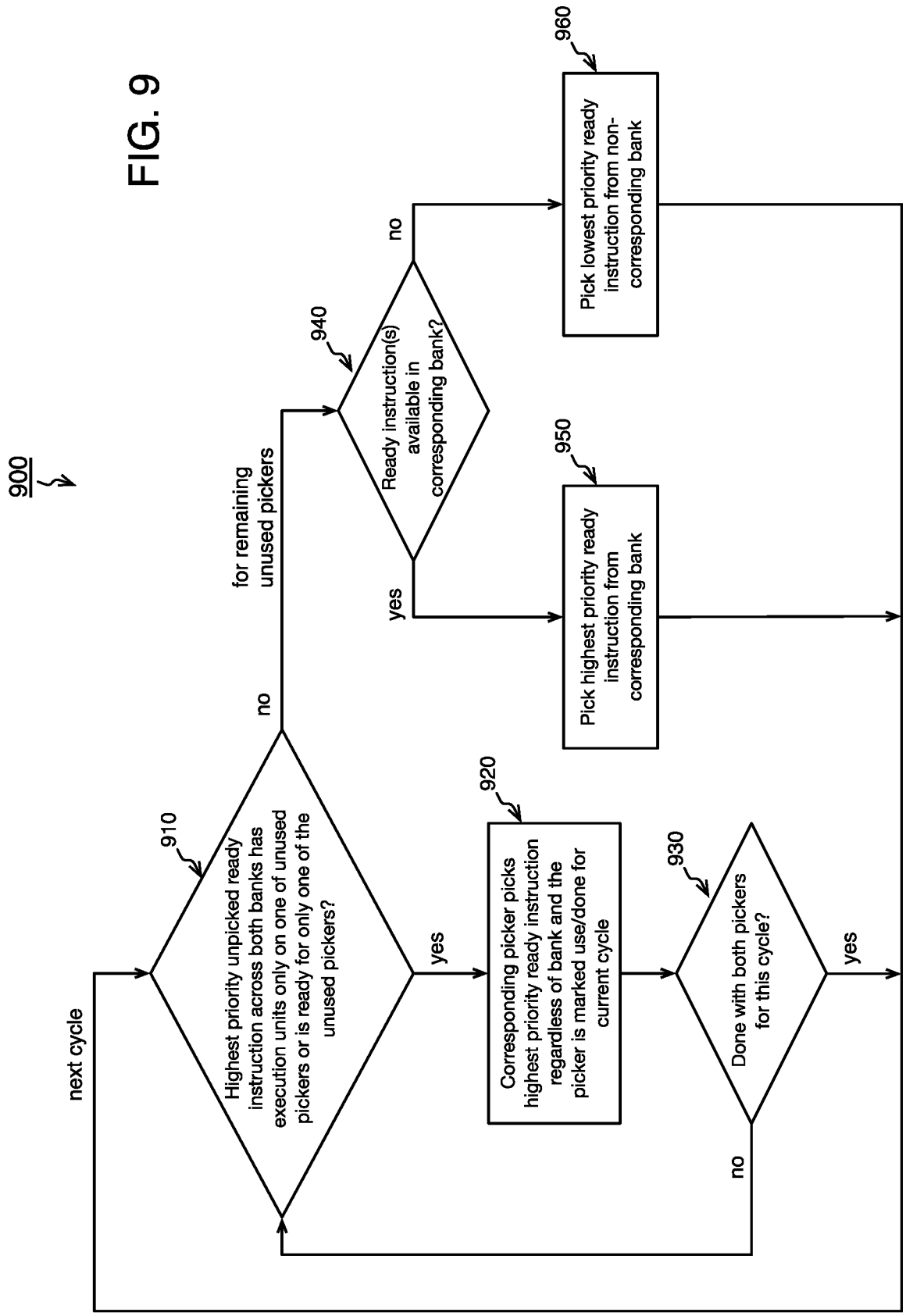
FIG. 9 is a flow diagram depicting an example algorithm for picking instructions from a partitioned issue queue based at least in part on instruction category and priority, in accordance with an embodiment.

FIG. 9 is a flow diagram depicting an example algorithm 900 for picking instructions from a partitioned issue queue, such as issue queue 210, based at least in part on instruction category and priority. As indicated at block 910, a determination may be made as to whether a highest priority unpicked ready instruction evaluated across both banks of an issue queue, such as issue queue 210, has execution units corresponding to only one of the unused picker circuits or is ready for only one of the unused picker circuits. If such a determination is made in the affirmative, a corresponding picker circuit may pick the highest priority ready instruction of issue queue 210 regardless of which bank holds the highest priority ready instruction and the corresponding picker is marked use/done for current cycle, as indicated at block 920. Further, as indicated at block 930, a determination may be made as to whether both/all picker circuits have made their respective selections for the current cycle. If no, the algorithm returns to block 910. Otherwise, the algorithm may move to the next cycle.

In circumstances in which the determination of block 910 is made in the negative, each individual remaining unused picker circuit may select ready instructions in a manner similar to discussed previously, such as in connection with FIG. 5. For example, as indicated at blocks 940, 950, and/or 960, each picker circuit may select a highest priority (e.g., least-recently added to issue queue) ready instruction from its corresponding bank. In circumstances in which no ready instruction is available in the corresponding bank, the picker circuit may select a lowest priority ready instruction from a non-corresponding bank.

In some implementations, processing circuitry, such as processing circuitry 100, may be pipeline-clustered. As mentioned, some implementations may comprise execution units arranged into clusters. In such clusters, operands may be communicated among the cluster. Therefore, in some circumstances, particular instructions that rely on operands to be generated within a particular cluster may be selected by a picker circuit corresponding to that particular cluster. That is, instructions (e.g., micro-operations) in an issue queue, such as issue queue 210, that are just woken up in the current cycle (i.e., instructions that were not ready in the preceding cycle but are marked ready to issue in the current cycle) may be issued only to the particular cluster that their producer was issued to.

For example, returning to the example shown in FIG. 8, assume that the second category instruction at index 2 of the first bank of issue queue 210 includes operands to be calculated within a cluster represented by execution units 233 that may only be serviced via second picker circuit 222. In this example circumstance, as the instruction at index 2 of the first bank becomes the highest priority ready instruction across both banks, the 2nd picker may select this particular instruction without regard to which bank it is located in.

The example implementations described above may allow for picker circuit configurations to improve and/or maximize throughput. Further, the examples described herein may help ensure that multiple pickers, such as first and second picker circuits, can identify picks independent of each other and thus can select multiple (e.g., two) picks in a single cycle.

Concepts described herein may be embodied in an apparatus comprising execution circuitry having one or more vector processing units for performing vector operations on vectors comprising multiple data elements, for example. Execution circuitry having X vector processing units configured to perform vector operations on Y bit wide vectors with the respective vector processing units operable in parallel, for example, may be said to have an X×Y bit vector datapath. In some embodiments, execution circuitry may be provided having six or more vector processing units. In some embodiments, execution circuitry may be provided having five or fewer vector processing units, for example. In some embodiments, execution circuitry may be provided having two vector processing units (and no more). In some embodiments, one or more vector processing units may be configured to perform vector operations on 128-bit wide vectors, for example. In some embodiments, execution circuitry may comprise a 2×128 bit vector datapath. Alternatively, in some embodiments execution circuitry may comprise a 6×128 bit vector datapath, for example.

Concepts described herein may be embodied in an apparatus comprising a level one data (L1D) cache. The L1D cache may comprise a private cache associated with a given processing element (e.g. a central processing unit (CPU) or graphics processing element (GPU)), for example. In a cache hierarchy of multiple caches capable of caching data accessible by load/store operations processed by the given processing element, an L1D cache may comprise a level of cache in the hierarchy which may be faster to access than a level two (L2) cache. In some embodiments, the L1D cache may comprise the fastest to access in the hierarchy, although even faster to access caches, such as level zero (L0) caches, for example, may also be provided. In implementations, if a load/store operation hits in an L1D cache, it may be serviced with lower latency than if the load/store operation misses in the L1D cache and is serviced based on data in a subsequent level of cache or in memory, for example. In some embodiments, the L1D cache may comprise storage capacity of less than 96 KB, for example. In one example, the L1D cache may comprise a 64 KB cache. In some embodiments, an L1D cache may comprise storage capacity of greater than or equal to 96 KB, for example. In one example, the L1D cache may comprise a 128 KB cache.

Concepts described herein may be embodied in an apparatus comprising a level two (L2) cache. The L2 cache for a given processing element may comprise a level of cache in the cache hierarchy that, among caches capable of holding data accessible to load/store operations, may be the next fastest to access after the L1D cache. The L2 cache may be looked up in response to a load/store operation missing in an L1D cache or an instruction fetch missing in an L1 instruction cache, for example. In some embodiments, an L2 cache may comprise storage capacity of less than 1536 KB (1.5 MB), for example. In one example, the L2 cache may comprise a 1024 KB (1 MB) cache. In some embodiments, an L2 cache may comprise storage capacity greater than or equal to 1536 KB and less than 2560 KB (2.5 MB), for example. In one example, the L2 cache may comprise a 2048 KB (2 MB) cache. In some embodiments, the L2 cache may comprise storage capacity greater than or equal to 2560 KB, for example. In one example, the L2 cache may comprise a 3072 KB (3 MB) cache. In some embodiments, an L2 cache may have a larger storage capacity than an L1D cache, for example.

Figure 10:
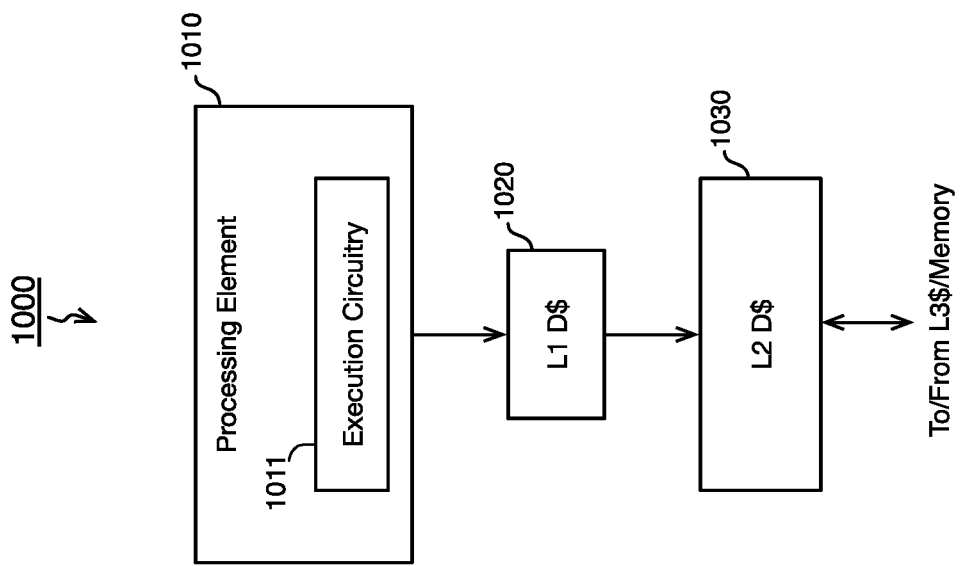
FIG. 10. is a schematic block diagram illustrating an example apparatus including a processing element and data caches, in accordance with an embodiment.

FIG. 10 illustrates an example of an apparatus 1000 comprising a processing element 1010 (e.g. a CPU or GPU) comprising execution circuitry 1011 for executing processing operations in response to decoded program instructions. Processing element 1010 may have access to a first-level data cache (L1D$) 1020 and a second level data cache (L2D$) 1030, which may comprise part of a cache hierarchy including multiple caches for caching data from memory that is accessible by processing element 1010 in response to load/store operations executed by the execution circuitry 1011, for example. Example embodiments and/or implementations of processing circuitry and/or execution circuitry are described herein in connection with FIGS. 1-9, for example. For example, FIG. 1 shows a first level data cache (L1D$) 115 and load/store circuitry 174. Execution units 172 are also shown in FIGS. 1, 2, and 8, for example, while example issue/scheduler circuitry and/or issue queues are discussed herein in connection with FIGS. 2-9, for example.

Figure 11:
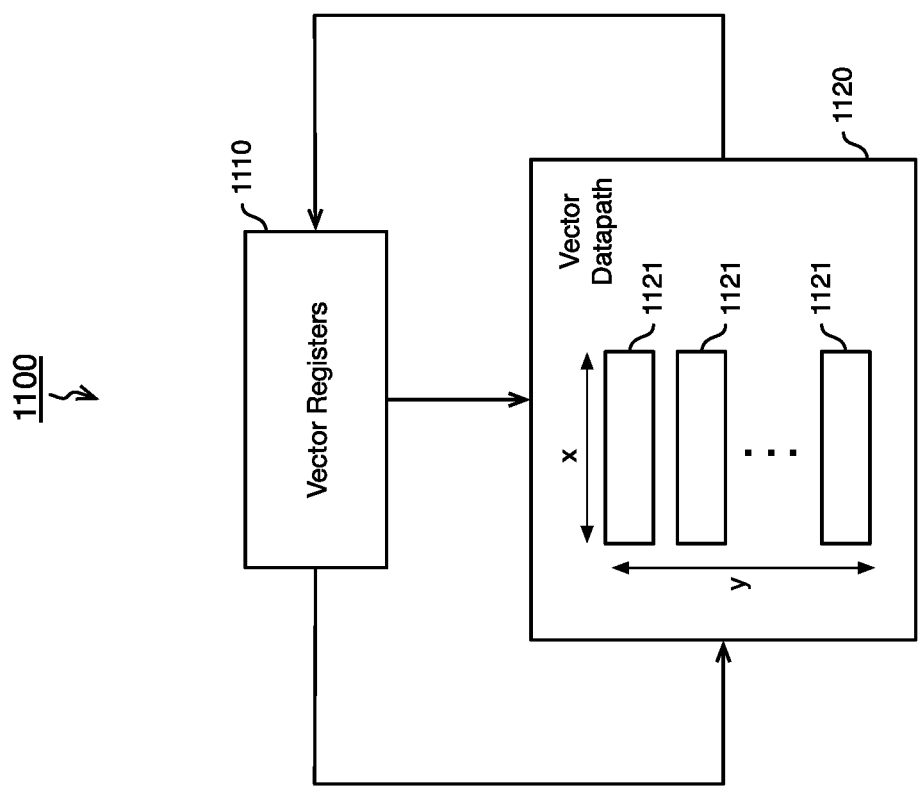
FIG. 11 is a schematic block diagram illustrating an example vector datapath, in accordance with an embodiment.

FIG. 11 illustrates an example of a vector datapath 1120 that may be provided as part of the execution circuitry 1011 of the processing element 1010, and vector registers 1110 for storing vector operands for processing by vector datapath 1120. Vector operands read from vector registers 1110 may be processed by vector datapath 1120 to generate vector results which may be written back to vector registers 1110. In implementations, vector datapath 1120 may comprise an X×Y bit vector datapath including X vector processing units 1121 individually configured to perform vector operations on Y bit vectors. In implementations, vector registers 1110 may be accessible as Z bit vector registers, where Z may be equal to Y or different from Y. For a vector operation involving a Z-bit vector operand where Z is greater than Y, the Z-bit vector operand may be processed using two or more vector processing units 1121 operating in parallel on different portions of the Z-bit vector operand in the same cycle and/or using multiple passes through the vector datapath in two or more cycles, for example. For vector operations involving a Z-bit vector operand where Z is less than Y, a given vector processing unit 1121 may process two or more vectors in parallel, for example.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioral representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII, for example. The one or more netlists or other computer-readable representation of integrated circuit components may be generated by applying one or more logic synthesis processes to an RTL representation to generate definitions for use in fabrication of an apparatus embodying embodiments, such as those described herein, for example. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly, for example.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying embodiments, such as those described herein, for example. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept, for example.

Embodiments may also be described, at least in part, by the following numbered clauses:

Clause 1. An apparatus, comprising:
an issue queue logically partitioned into first and second banks; and
first and second picker circuits corresponding respectively to the first and second banks;
wherein, for a first cycle:
the first picker circuit is to determine whether one or more instructions from its corresponding first bank are ready;
the second picker circuit is to determine whether one or more instructions from its corresponding second bank are ready;
responsive at least in part to a determination that one or more instructions from its corresponding first bank are ready, the first picker circuit is to select a first ready instruction from its corresponding first bank;
responsive at least in part to a determination that no instructions from its corresponding first bank are ready, the first picker circuit is to select the first ready instruction from its non-corresponding second bank;
responsive at least in part to a determination that one or more instructions from its corresponding second bank are ready, the second picker circuit is to select a second ready instruction from its corresponding second bank; and
responsive at least in part to a determination that no instructions from its corresponding second bank are ready, the second picker circuit is to select the second ready instruction from its non-corresponding first bank.

Clause 2. The apparatus of clause 1, wherein the first picker circuit and the second picker circuit are to select the first and second ready instructions, respectively, independent of each other.

Clause 3. The apparatus of any of the aforementioned clauses, wherein, to select the first ready instruction from its corresponding first bank, the first picker circuit is to select a highest priority ready instruction from its corresponding first bank and wherein, to select the second ready instruction from its corresponding second bank, the second picker circuit is to select a highest priority ready instruction from its corresponding second bank.

Clause 4. The apparatus of any of the aforementioned clauses, wherein, to select the first ready instruction from its non-corresponding second bank responsive at least in part to the determination that no instructions from its corresponding first bank are ready, the first picker circuit is to select a lowest priority ready instruction from its non-corresponding second bank and wherein, to select the second ready instruction from its non-corresponding first bank responsive to the determination that no instructions from its corresponding second bank are ready, the second picker circuit is to select a lowest priority ready instruction from its non-corresponding first bank.

Clause 5. The apparatus of any of the aforementioned clauses, wherein the highest priority ready instruction from the corresponding first or second bank is to comprise a ready instruction least recently added to the corresponding first or second bank.

Clause 6. The apparatus of any of the aforementioned clauses, wherein the lowest priority ready instruction from the non-corresponding first or second bank is to comprise a ready instruction most recently added to the non-corresponding first or second bank.

Clause 7. The apparatus of any of the aforementioned clauses, further comprising: first and second execution units corresponding respectively to the first and second picker circuits; wherein, for the first cycle, the first and second picker circuits are to issue the selected first and second ready instructions to the respective first and second execution units.

Clause 8. The apparatus of any of the aforementioned clauses, wherein the first and second ready instructions are to be selected by the first and second picker circuits, respectively, on a repetitive, per-cycle basis.

Clause 9. The apparatus of any of the aforementioned clauses, wherein the first and second picker circuits are to issue the selected first and second ready instructions to the respective first and second execution units on the repetitive, per-cycle basis.

Clause 10. The apparatus of any of the aforementioned clauses, wherein the first bank of the issue queue comprises a first plurality of entries and the second bank of the issue queue comprises a second plurality of entries.

Clause 11. The apparatus of any of the aforementioned clauses, further comprising circuitry to evaluate, on a per-cycle basis, priority and ready status for one or more first instructions stored in the first plurality of entries of the first bank and for one or more second instructions stored in the second plurality of entries of the second bank.

Clause 12. The apparatus of any of the aforementioned clauses, wherein: the first bank is partitioned into a first plurality of hierarchical zones, including at least a first higher priority zone and a first lower priority zone; and the second bank is partitioned into a second plurality of hierarchical zones, including at least a second higher priority zone and a second lower priority zone.

Clause 13. The apparatus of any of the aforementioned clauses, wherein, for the first cycle: to select the first ready instruction from its corresponding first bank, the first picker circuit is to select the first ready instruction from the first higher priority zone and, responsive at least in part to no instruction being ready from the first higher priority zone, select the first ready instruction from the first lower priority zone; to select the first ready instruction from its non-corresponding second back responsive at least in part to a determination that no instructions from its corresponding first bank are ready, the first picker circuit is to select the first ready instructions from the second lower priority zone, and, responsive at least in part to no instruction from the second lower priority zone being ready, the first picker circuit is to select the first ready instruction from the second higher priority zone; to select the second ready instruction from its corresponding second bank, the second picker circuit is to select the second ready instruction from the second higher priority zone and, responsive at least in part to no instruction being ready from the second higher priority zone, the second picker is to select the second ready instruction from the second lower priority zone; and to select the second ready instruction from its non-corresponding first bank responsive at least in part to a determination that no instructions from its corresponding second bank are ready, the second picker circuit is to select the second ready instruction from the first lower priority zone, and, responsive at least in part to no instruction from the first lower priority zone being ready, the second picker circuit is to select the second ready instruction from the first higher priority zone.

Clause 14. The apparatus of any of the aforementioned clauses, further comprising circuitry to promote a first instruction from the first or second lower priority zones to the first or second higher priority zones responsive at least in part to an issuance of the first ready instruction to a first execution unit or an issuance of the second ready instruction to a second execution unit and/or responsive at least in part to an availability of vacant and/or unused entries in the first or second higher priority zones.

Clause 15. The apparatus of any of the aforementioned clauses, further comprising: a first execution unit corresponding to the first picker circuit; and second and third execution units corresponding to the second picker circuit, wherein the first and second execution units comprise a first category of execution circuitry and wherein the third execution unit comprises a second category of execution circuitry, wherein the first and second categories of execution circuitry differ one from the other.

Clause 16. The apparatus of any of the aforementioned clauses, wherein, responsive at least in part to a highest priority ready instruction stored in the combined first and second banks being determined to correspond to the second category of execution circuitry, the second picker circuit is to select the highest priority ready instruction for the second ready instruction regardless of whether the highest priority ready instruction is stored in the first bank or the second bank.

Clause 17. The apparatus of any of the aforementioned clauses, further comprising: one or more first execution units corresponding to the first picker circuit; and a second cluster of execution units corresponding to the second picker circuit, wherein, responsive at least in part to a highest priority ready instruction stored in the combined first and second banks being determined to be executable solely by the second cluster of execution units, the second picker circuit is to select the highest priority ready instruction for the second ready instruction regardless of whether the highest priority ready instruction is stored in the first bank or the second bank.

Clause 18. The apparatus of any of the aforementioned clauses, further comprising execution circuitry comprising a 6×128 bit vector datapath.

Clause 19. A method, comprising: logically partitioning an issue queue into first and second banks, wherein first and second picker circuits correspond respectively to the first and second banks; determining, for a first cycle by the first picker circuit, whether one or more instructions from its corresponding first bank are ready; determining, for the first cycle by the second picker circuit, whether one or more instructions from its corresponding second bank are ready; responsive at least in part to a determination by the first picker circuit that one or more instructions from the first bank are ready, selecting, for the first cycle by the first picker circuit, a first ready instruction from the first bank; responsive at least in part to a determination that no instructions from the first bank are ready, selecting, for the first cycle by the first picker circuit, the first ready instruction from the second bank; responsive at least in part to a determination that one or more instructions from the second bank are ready, selecting, for the first cycle by the second picker circuit, a second ready instruction from the second bank; and responsive at least in part to a determination that no instructions from the second bank are ready, selecting, for the first cycle by the second picker circuit, the second ready instruction from the first bank.

Clause 20. A non-transitory computer-readable medium to store computer-readable code for fabrication of an apparatus comprising: an issue queue logically partitioned into first and second banks; first and second picker circuits corresponding respectively to the first and second banks; first and second execution units, wherein the first and second picker circuits respectively correspond to the first and second execution units; wherein, for a first cycle: the first picker circuit is to determine whether one or more instructions from its corresponding first bank are ready; the second picker circuit is to determine whether one or more instructions from its corresponding second bank are ready; responsive at least in part to a determination that one or more instructions from its corresponding first bank are ready, the first picker circuit is to select a first ready instruction from its corresponding first bank; responsive at least in part to a determination that no instructions from its corresponding first bank are ready, the first picker circuit is to select the first ready instruction from its non-corresponding second bank; responsive at least in part to a determination that one or more instructions from its corresponding second bank are ready, the second picker circuit is to select a second ready instruction from its corresponding second bank; and responsive at least in part to a determination that no instructions from its corresponding second bank are ready, the second picker circuit is to select the second ready instruction from its non-corresponding first bank.

It will be clear to one skilled in the art that many improvements and modifications can be made to the foregoing exemplary embodiments without departing from the scope of the present techniques.

What is claimed is:

1. An apparatus, comprising:
   an issue queue logically partitioned into first and second banks; and
   first and second picker circuits corresponding respectively to the first and second banks;
   wherein, for a first cycle:
   the first picker circuit is to determine whether one or more instructions from its corresponding first bank are ready;
   the second picker circuit is to determine whether one or more instructions from its corresponding second bank are ready;
   responsive at least in part to a determination that one or more instructions from its corresponding first bank are ready, the first picker circuit is to select a first ready instruction from its corresponding first bank;
   responsive at least in part to a determination that no instructions from its corresponding first bank are ready, the first picker circuit is to select the first ready instruction from its non-corresponding second bank;
   responsive at least in part to a determination that one or more instructions from its corresponding second bank are ready, the second picker circuit is to select a second ready instruction from its corresponding second bank; and
   responsive at least in part to a determination that no instructions from its corresponding second bank are ready, the second picker circuit is to select the second ready instruction from its non-corresponding first bank.

2. The apparatus of claim 1, wherein the first picker circuit and the second picker circuit are to select the first and second ready instructions, respectively, independent of each other.

3. The apparatus of claim 1, wherein, to select the first ready instruction from its corresponding first bank, the first picker circuit is to select a highest priority ready instruction from its corresponding first bank and wherein, to select the second ready instruction from its corresponding second bank, the second picker circuit is to select a highest priority ready instruction from its corresponding second bank.

4. The apparatus of claim 3, wherein, to select the first ready instruction from its non-corresponding second bank responsive at least in part to the determination that no instructions from its corresponding first bank are ready, the first picker circuit is to select a lowest priority ready instruction from its non-corresponding second bank and wherein, to select the second ready instruction from its non-corresponding first bank responsive to the determination that no instructions from its corresponding second bank are ready, the second picker circuit is to select a lowest priority ready instruction from its non-corresponding first bank.

5. The apparatus of claim 4, wherein the highest priority ready instruction from the corresponding first or second bank is to comprise a ready instruction least recently added to the corresponding first or second bank.

6. The apparatus of claim 5, wherein the lowest priority ready instruction from the non-corresponding first or second bank is to comprise a ready instruction most recently added to the non-corresponding first or second bank.

7. The apparatus of claim 6, further comprising:
   first and second execution units corresponding respectively to the first and second picker circuits;
   wherein, for the first cycle, the first and second picker circuits are to issue the selected first and second ready instructions to the respective first and second execution units.

8. The apparatus of claim 7, wherein the first and second ready instructions are to be selected by the first and second picker circuits, respectively, on a repetitive, per-cycle basis.

9. The apparatus of claim 8, wherein the first and second picker circuits are to issue the selected first and second ready instructions to the respective first and second execution units on the repetitive, per-cycle basis.

10. The apparatus of claim 9, wherein the first bank of the issue queue comprises a first plurality of entries and the second bank of the issue queue comprises a second plurality of entries.

11. The apparatus of claim 10, further comprising circuitry to evaluate, on a per-cycle basis, priority and ready status for one or more first instructions stored in the first plurality of entries of the first bank and for one or more second instructions stored in the second plurality of entries of the second bank.

12. The apparatus of claim 1, wherein:
    the first bank is partitioned into a first plurality of hierarchical zones, including at least a first higher priority zone and a first lower priority zone; and
    the second bank is partitioned into a second plurality of hierarchical zones, including at least a second higher priority zone and a second lower priority zone.

13. The apparatus of claim 12, wherein, for the first cycle:
    to select the first ready instruction from its corresponding first bank, the first picker circuit is to select the first ready instruction from the first higher priority zone and, responsive at least in part to no instruction being ready from the first higher priority zone, select the first ready instruction from the first lower priority zone;
    to select the first ready instruction from its non-corresponding second back responsive at least in part to a determination that no instructions from its corresponding first bank are ready, the first picker circuit is to select the first ready instruction from the second lower priority zone, and, responsive at least in part to no instruction from the second lower priority zone being ready, the first picker circuit is to select the first ready instruction from the second higher priority zone;
    to select the second ready instruction from its corresponding second bank, the second picker circuit is to select the second ready instruction from the second higher priority zone and, responsive at least in part to no instruction being ready from the second higher priority zone, the second picker circuit is to select the second ready instruction from the second lower priority zone; and
    to select the second ready instruction from its non-corresponding first bank responsive at least in part to a determination that no instructions from its corresponding second bank are ready, the second picker circuit is to select the second ready instruction from the first lower priority zone, and, responsive at least in part to no instruction from the first lower priority zone being ready, the second picker circuit is to select the second ready instruction from the first higher priority zone.

14. The apparatus of claim 13, further comprising circuitry to promote a first instruction from the first or second lower priority zones to the first or second higher priority zones responsive at least in part to an issuance of the first ready instruction to a first execution unit or an issuance of the second ready instruction to a second execution unit and/or responsive at least in part to an availability of vacant and/or unused entries in the first or second higher priority zones.

15. The apparatus of claim 1, further comprising:
a first execution unit corresponding to the first picker circuit; and
second and third execution units corresponding to the second picker circuit, wherein the first and second execution units comprise a first category of execution circuitry and wherein the third execution unit comprises a second category of execution circuitry, wherein the first and second categories of execution circuitry differ one from the other.

16. The apparatus of claim 15, wherein, responsive at least in part to a highest priority ready instruction stored in the combined first and second banks being determined to correspond to the second category of execution circuitry, the second picker circuit is to select the highest priority ready instruction for the second ready instruction regardless of whether the highest priority ready instruction is stored in the first bank or the second bank.

17. The apparatus of claim 1, further comprising:
one or more first execution units corresponding to the first picker circuit; and
a second cluster of execution units corresponding to the second picker circuit, wherein, responsive at least in part to a highest priority ready instruction stored in the combined first and second banks being determined to be executable solely by the second cluster of execution units, the second picker circuit is to select the highest priority ready instruction for the second ready instruction regardless of whether the highest priority ready instruction is stored in the first bank or the second bank.

18. The apparatus of claim 1, further comprising execution circuitry comprising a 6×128 bit vector datapath.

19. A method, comprising:
logically partitioning an issue queue into first and second banks, wherein first and second picker circuits correspond respectively to the first and second banks;
determining, for a first cycle by the first picker circuit, whether one or more instructions from its corresponding first bank are ready;
determining, for the first cycle by the second picker circuit, whether one or more instructions from its corresponding second bank are ready;
responsive at least in part to a determination by the first picker circuit that one or more instructions from the first bank are ready, selecting, for the first cycle by the first picker circuit, a first ready instruction from the first bank;
responsive at least in part to a determination that no instructions from the first bank are ready, selecting, for the first cycle by the first picker circuit, the first ready instruction from the second bank;
responsive at least in part to a determination that one or more instructions from the second bank are ready, selecting, for the first cycle by the second picker circuit, a second ready instruction from the second bank; and
responsive at least in part to a determination that no instructions from the second bank are ready, selecting, for the first cycle by the second picker circuit, the second ready instruction from the first bank.

20. A non-transitory computer-readable medium to store computer-readable code for fabrication of an apparatus comprising:
an issue queue logically partitioned into first and second banks;
first and second picker circuits corresponding respectively to the first and second banks;
first and second execution units, wherein the first and second picker circuits respectively correspond to the first and second execution units;
wherein, for a first cycle:
the first picker circuit is to determine whether one or more instructions from its corresponding first bank are ready;
the second picker circuit is to determine whether one or more instructions from its corresponding second bank are ready;
responsive at least in part to a determination that one or more instructions from its corresponding first bank are ready, the first picker circuit is to select a first ready instruction from its corresponding first bank;
responsive at least in part to a determination that no instructions from its corresponding first bank are ready, the first picker circuit is to select the first ready instruction from its non-corresponding second bank;
responsive at least in part to a determination that one or more instructions from its corresponding second bank are ready, the second picker circuit is to select a second ready instruction from its corresponding second bank; and
responsive at least in part to a determination that no instructions from its corresponding second bank are ready, the second picker circuit is to select the second ready instruction from its non-corresponding first bank.

* * * * *